US008423484B2

(12) United States Patent
Pecht et al.

(10) Patent No.: US 8,423,484 B2
(45) Date of Patent: Apr. 16, 2013

(54) PROGNOSTICS AND HEALTH MANAGEMENT METHOD FOR AGING SYSTEMS

(75) Inventors: Michael G. Pecht, College Park, MD (US); Shunfeng Chen, Hyattsville, MD (US)

(73) Assignee: Oxfordian, LLC, Dallas, TX (US)

( * ) Notice: Subject to any disclaimer, the term of this patent is extended or adjusted under 35 U.S.C. 154(b) by 654 days.

(21) Appl. No.: 12/657,249

(22) Filed: Jan. 15, 2010

(65) Prior Publication Data
US 2010/0191681 A1 Jul. 29, 2010

Related U.S. Application Data

(60) Provisional application No. 61/205,763, filed on Jan. 23, 2009.

(51) Int. Cl.
*G06F 15/18* (2006.01)

(52) U.S. Cl.
USPC .......................................................... 706/12

(58) Field of Classification Search .................... 706/12, 706/15, 45–47, 62
See application file for complete search history.

(56) References Cited

U.S. PATENT DOCUMENTS

| | | | |
|---|---|---|---|
| 5,459,675 A | 10/1995 | Gross et al. | |
| 6,119,111 A | 9/2000 | Gross et al. | |
| 6,892,317 B1 * | 5/2005 | Sampath et al. | 714/4.3 |
| 7,457,785 B1 * | 11/2008 | Greitzer et al. | 706/12 |
| 8,073,653 B2 * | 12/2011 | Suzuki et al. | 702/181 |
| 2005/0114088 A1 * | 5/2005 | Gorden et al. | 702/185 |
| 2008/0141072 A1 * | 6/2008 | Kalgren et al. | 714/33 |
| 2009/0107219 A1 * | 4/2009 | Douglas | 73/61.63 |
| 2009/0259507 A1 * | 10/2009 | Miwa et al. | 705/8 |

OTHER PUBLICATIONS

Herzog, et al., MSET Modeling of Crystal River-3 Venturi Flow Meters, In ASMA/JSME/SFEN 6th International conference of Nuclear Engineering, pp. 1-14, 1998.
K Whisnant, et al., Proactive Fault Monitoring in Enterprise Servers, Proceedings of the IEEE International Conference on Computer Design, pp. 3-10, Jun. 27-30, 2005.
Wang, et al., Ind. Eng. Chem. Res. 2005, 44, pp. 5691-5702. Process Monitoring Approach Using Fast Moving Window PCA.
Zhenhua Mao, et al., IEEE Fourth International Conference on Natural Computation, pp. 18-21, 2008, A Flexible Principle Component Analysis Method for Process Monitoring.

* cited by examiner

*Primary Examiner* — Kakali Chaki
*Assistant Examiner* — Mai T Tran
(74) *Attorney, Agent, or Firm* — Lawrence Edelman; The Law Office of Lawrence Edelman (57) ABSTRACT

The present invention provides a novel prognostic and health management method for natural aging systems. This prognostic and health management method can detect anomalies in a system in advance, and can determine whether the detected anomalies are due to natural aging or other aging processes. In this prognostic method, a moving window method for improving the performance of the conventional data-driven prognostic methods is described. This prognostic and health management method combines with the detections by the data-driven prognostic method based on the conventional training and moving window methods to determine whether the detected anomalies are due to natural aging or other aging processes and in so doing can reduce the number of false alarms; reduce cost of a system by decreasing the unnecessary maintenance, downtime, and inventory; can extend the life of systems; and can assist in the design and qualification of future systems to improve their reliability.

12 Claims, 10 Drawing Sheets

FIG. 14 though they identified aging by the observation of aging effects based on experience with the specific equipment in a similar application. Third, the aging mechanisms can be complex when the system is operated under multiple stresses. The models created based on a single stress are not suitable to a system operating under multiple stresses.

PROGNOSTICS AND HEALTH MANAGEMENT METHOD FOR AGING SYSTEMS

CROSS REFERENCE TO RELATED CASES

This application claims priority to Provisional U.S. Patent Application Ser. No. 61/205,763 filed Jan. 23, 2009 and entitled "A Prognostic Method for Aging Systems", which application is incorporated by reference in its entirety, as if fully set forth herein.

This application relates to Utility Patent Application filed this same date, entitled Prognostics and Health Management Implementation for Self Cognizant Electronic Products, Michael Pecht and Jie Gu, inventors, which utility application claims priority to Provisional Application Ser. No. 61/205,774 filed Jan. 23, 2009, entitled 'Prognostics and Health Management Implementation for Individual Electronic Products", Michael Pecht and Jie Gu, inventors.

BACKGROUND OF THE INVENTION

1. Field of the Invention

The present invention relates to a prognostics and health management (PHM) method for natural aging systems. More specifically, the present invention relates to a prognostic method for detecting anomalies in a system and determining whether the detected anomalies are due to natural aging or other aging processes which can be precursors to failure.

2. Review of the Related Art

Natural aging is a process in which the properties or attributes (such as shape; dimension; weight; condition indicators; functional indicators; performance; or mechanical, chemical, or electrical properties) of a material, structure, or system gradually change (for better or worse) over time or with use. Natural aging can be divided into negative aging and positive aging. Negative aging is often manifested as degradation, such as a reduction in diameter from wear, loss in material strength from fatigue or thermal aging, a loss of dielectric strength, the cracking of insulation, a shift in electrical parameters, etc. Negative aging increases the failure rate of a system and is often accelerated by adverse environmental and operational conditions. Negative aging can lead to the failure of the system if the effects of aging accumulate to a certain critical level.

Positive aging manifests itself in the form of changes that improve the properties or attributes of a system. For example, the increase in concrete strength from curing, reduced vibration from wear-in of rotating machinery, etc. There may also be "other aging" that differs from the main population of natural aging systems due to flaws or defects in the material structures or systems.

PHM is an enabling discipline of technologies and methods that permit the reliability of a system to be evaluated in actual life cycle conditions in order to determine the advent of a failure and mitigate system risks. PHM combines the sensing and interpretation of environmental, operational, and performance-related parameters to indicate the health of a system. PHM can provide advanced warning of failures; can reduce the life cycle cost of a system by decreasing inspection costs, downtime, and inventory; and can assist in the design and logistical support of fielded and future systems.

PHM methods can be classified as data-driven methods, physics-of-failure (PoF) methods, and fusion methods that combine data-driven methods and PoF methods. Data-driven prognostic methods can use available and historical information to statistically and probabilistically derive decisions, estimates, and predictions about the health and reliability of systems. The data-driven methods include statistical methods and machine learning methods. The PoF approach uses underlying engineering and failure principles to model and predict remaining useful life. PoF methods require models based on an understanding of the physics of the failure or failure mechanisms Previous research on aging of a system has focused on aging risk evaluation and assessment. Failure-rate-based models and physical probabilistic analysis models have been presented in the literature. Failure-rate-based models are often created based on a distribution such as Weibull, or an exponential distribution. But these models require adequate data to statistically analyze the change of a failure rate. Physical probabilistic analysis investigates the possible aging mechanisms, including fatigue, corrosion, and radiation, etc. However, there are many difficulties regarding the use of these models in actual applications. First, the degradation of a system is often caused by a combination of different processes, including aging. If the aging models are used to evaluate degradation due to factors not only including aging, the models will provide inaccurate results. Second, current methods lack a way to identify aging: in fact they identify aging by the observation of aging effects based on experience with the specific equipment in a similar application. Third, the aging mechanisms can be complex when the system is operated under multiple stresses. The models created based on a single stress are not suitable to a system operating under multiple stresses.

Conventional data driven prognostic methods for natural aging systems have problems when analyzing natural aging data. First, the conventional training process of some data-driven methods, such as the multivariate state estimation technique (MSET), the Mahalanobis distance (MD), and Neural Network (NN), cannot meet the requirements of the detection of natural aging systems if sufficient historical training data is not available. During the conventional training process, if historical data is not available, the training data is often obtained from the early, healthy stage of the detected system itself and is fixed once it is selected. As this early established fixed training data baseline cannot contain the entire range of normal, (i.e. healthy) data for a naturally aging system, the data-driven method can generate a false alarm, even when a new, normal pattern occurs. The second problem is that the data-driven methods cannot determine whether the detected anomalies are due to other aging processes within a naturally aging system.

SUMMARY OF THE INVENTION

The present invention provides a novel PHM method for natural aging systems. In general, this method combines a conventional data-driven method with a moving window data-driven method in order to detect anomalies and determine whether the anomalies are due to other aging processes within a natural aging system. The conventional data-driven method is used to detect anomalies that are caused by various types of causes, including natural aging, but it cannot distinguish natural aging from other aging processes indicative of pending failure. In an embodiment of this invention, a moving window data-driven method is used to detect anomalies not due to natural aging. The combination of results obtained by these two methods can be used to distinguish natural aging or other aging processes, and the anomalies caused by them.

In one embodiment, a multivariate state estimation technique (MSET) is used as an example to demonstrate the implementation of the prognostic method for natural aging systems. In the Detailed Description which follows, an MW-MSET is developed to remove the effect of natural aging in the residuals. In the MW-MSET, the training data of the MSET is updated by a moving window. This updated training data contains the natural aging effect in the updated training data; thus the estimation will have the same natural aging effect. The residual, which is the difference between the observation and the estimation, then removes the natural aging effect. Thus, the anomalies detected by the MW-MSET are not caused by natural aging, but by other aging processes or failure mechanisms.

Below we demonstrate the processes and applications of the invention using multivariate state estimation techniques (MSET). It is to be appreciated, however, that this novel prognostic method can be implemented by many other data-driven methods that need to be trained by training data, such as Mahalanobis distance (MD) and neural network (NN) methods.

The PHM method for aging systems based on MSET uses the conventional MSET to detect anomalies shown in the monitored parameters. Then an improved MSET, the moving window MSET (MW-MSET), is developed to overcome the limitations of the conventional MSET. The combination of the conventional MSET and the MW-MSET has the ability to detect anomalies and determine whether the detected anomalies are due to natural aging or other aging processes.

In one embodiment, the moving window method includes a single-side moving window (extending window) method, and a double-side moving window method. In both methods, the size of the moving window or the amount of the data used to update the training data is fixed or flexible based on the specific applications.

In another embodiment, MW-MSET involves several models, including single-side MW-MSET (extending window MSET), and double-side MW-MSET, in both of which the size of the moving window or the amount of the data used to update the training data is fixed or flexible based on the actual applications.

The prognostics for natural aging systems needs to monitor multiple variables of the monitored system when the system is under the test conditions.

BRIEF DESCRIPTION OF THE DRAWINGS

So that the above-recited features of the present invention can be understood in detail, a more particular description of the invention, briefly summarized above, may be had by reference to various embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

The following section describes the process of the moving window method and describes the PHM for natural aging systems. The implementation of the prognostics for natural aging systems is demonstrated by MSET using two aging electrical components. In this demonstration, the MW-MSET methods and the combination of the conventional MSET and MW-MSET are described.

The general principles defined herein may be applied to other embodiments and applications without departing from the spirit and scope of the present invention. Thus, the present invention is not limited to the embodiments shown, but is to be accorded the widest scope consistent with the principle and features disclosed herein.

Moving Window Data-driven Method

Figure 1:
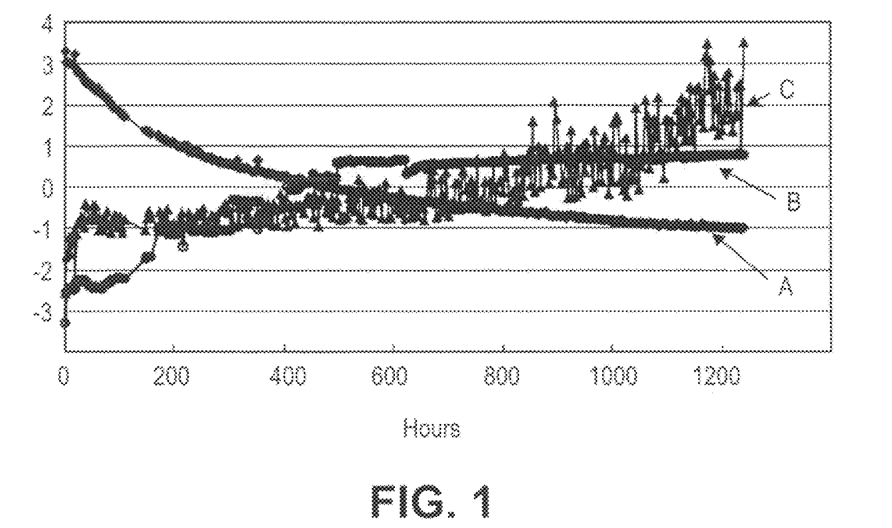
FIG. 1 presents an example of a natural aging component (component #1), in which parameters A and B are exhibiting negative aging, and parameter C shows positive aging.

The natural aging of a system is often exhibited as gradual changes in monitored parameters. FIG. 1 is an example of a normal (i.e. healthy) but natural aging electronic component (component #1) in which three parameters, A, B, and C, are monitored over time. The gradual changes of parameters A and B indicate negative aging, while the change in parameter C indicates positive aging.

Figure 2:
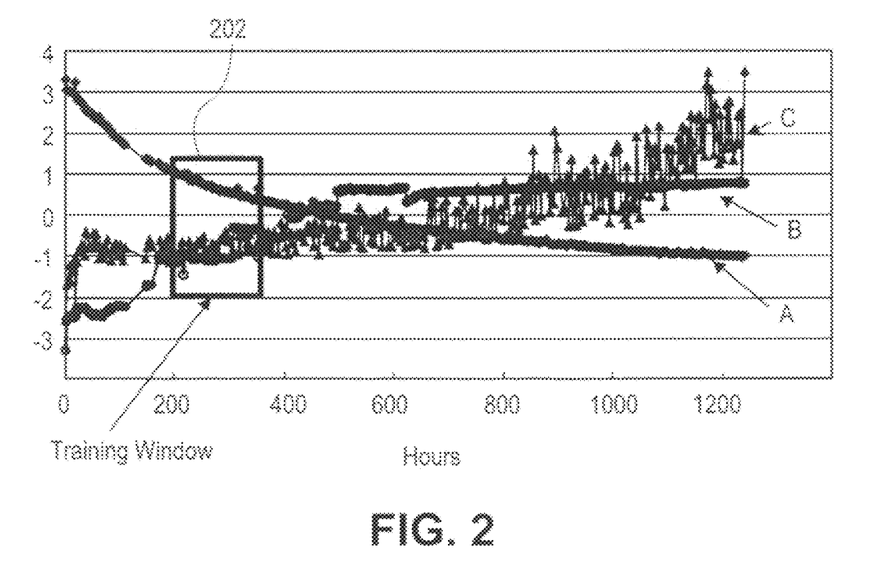
FIG. 2 presents the conventional training data and the conventional training process using the example of component #1.

For data-driven methods, the conventional training data can be selected from the historical data. If the historical data is not available, the training data then is selected from the early healthy stage of the aging system itself and the training data is often fixed once it is selected. Because the monitored data in a natural aging system is continuously and gradually changing (sometimes showing trends), the fixed training data does not contain the entire range of the healthy natural aging system or show the features of the latest change in the data. As shown in FIG. 2, a fixed training data window 202 does not contain the entire healthy range of aging component #1.

The moving window method can overcome the limitations of conventional training. The moving window methods can be divided into the single-side moving window method (extending window method), and the double-side moving window method, in both of which the size of the moving window or the amount of the data used to update the training data is fixed or flexible based on the actual applications.

Figure 3:
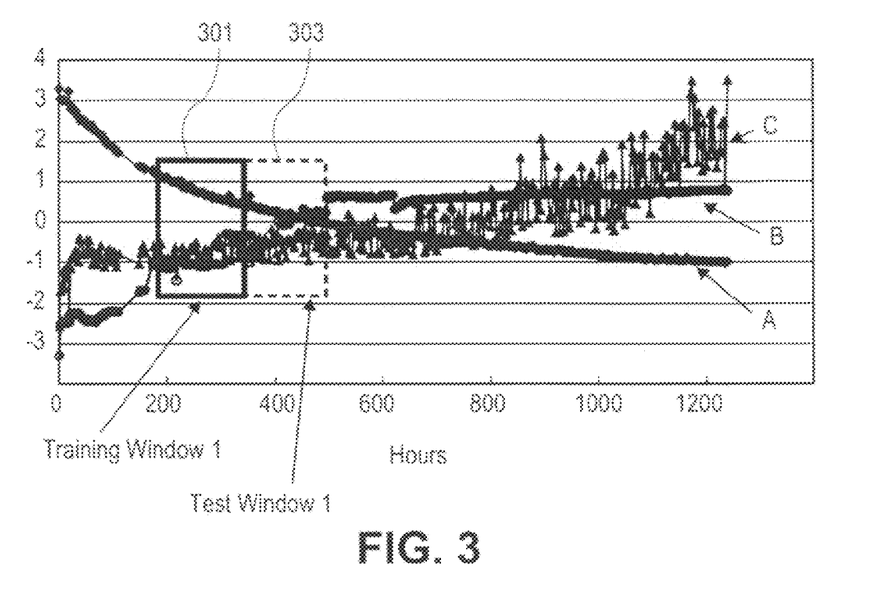
FIG. 3 illustrates the first training window and the first test window of the moving window data-driven methods using the example of component #1.
Figure 4:
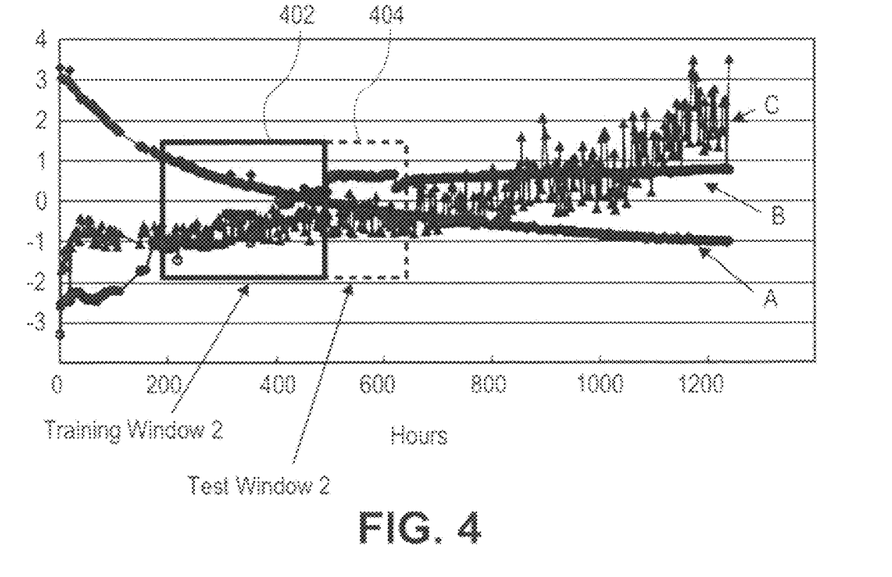
FIG. 4 illustrates the second training and test windows of a single-side moving window or extending window data-driven method using the example of component #1.

In the single-side moving window method or extending window method, the training data window is extended to include as much of the healthy data in the training data as possible. In other words, the updated training data adds new data into the training data without discarding the previous training data. Thus, all the features, including the natural aging of the healthy historical data are contained in the training data. The extending window training process includes the following steps in which component #1 is used as example, as shown in FIG. 3-FIG. 4:

Step 1: Select a first data collection interval as the first training window 301 and over the next data collection interval detect the data in the first test window 303, the window to the right of the training window in the figure.

Step 2: If no anomaly is detected for this newly collected data, the data in the current test window 303 is added to the current training data base 301 to update the training data. So the training data is extended to include the latest test data and the previous training data, as shown in window 402 of FIG. 4. If an anomaly is detected, the training data is not updated. As used herein, an anomaly is defined as at least five continuous test data readings that are outside of a defined healthy boundary.

Step 3: Having expanded the training data window 402 generated in step 2, over a next interval of time data in the next test window 404 is collected.

Step 4: Repeat step 2.

In an alternative embodiment of the invention a double-side moving window method may be employed. The double-side moving window method uses the latest data as training data, which includes the latest features of natural aging, and discards the previous training data. The double-side moving window approach includes the following steps in which component #1 is used as an example, as shown FIG. 3 and FIG. 5:

Step 1: Select the first training window 301 and detect the data in the first test window 303.

Step 2: If no anomaly is detected, the data in the current test window 303 is used as the updated training data, as shown in window 501 of FIG. 5. In other words, the entire training window is moved to the latest tested window, and the previous training data is discarded. If an anomaly is detected, the training data is not updated.

Figure 5:
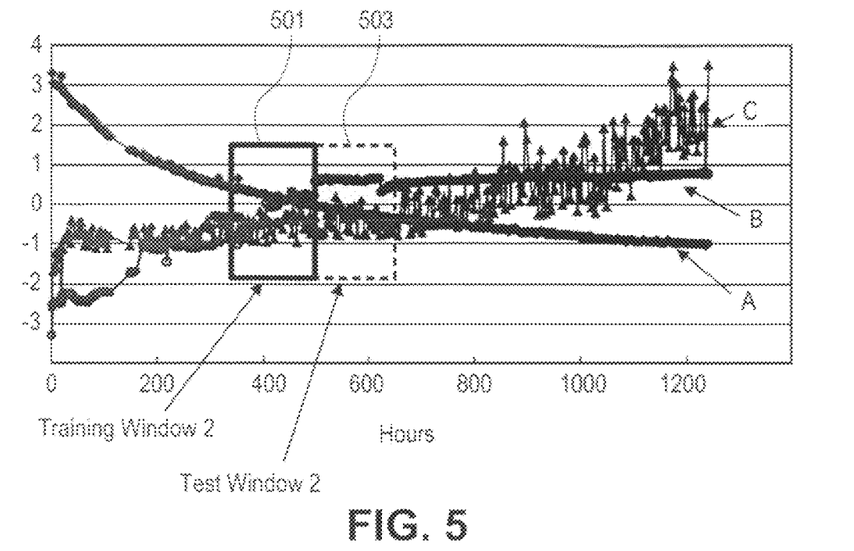
FIG. 5 illustrates the second training and test windows of a double-side moving window data-driven method using the example of component #1.

Step 3: Use the training data 501 generated in step 2 as the new baseline for comparison with newly detected data in the next test window 503.

Step 4: Repeat step 2.

In either approach, these steps are repeated n times until an anomaly is detected, after which maintenance of the part (i.e., its repair or replacement) can be conducted to remove the anomaly. As soon as the system recovers, the steps described above can be repeated again.

From one perspective, since the extending window training method contains more system healthy patterns, its performance can be expected to be to be more reliable than the double-side moving window method. However, since the windows of the double-side moving window method contains a smaller amount of training data, computations are simpler as fewer are required. Thus, for example, where the data being monitored exhibits gradual changing trends, the use of the double-side moving window method may well be preferable, given its greater simplicity.

Prognostics for Natural Aging Systems

As described above, conventional or moving window data-driven method alone cannot satisfy the requirements of the prognostics for natural aging systems. A PHM method for natural aging systems that combines the conventional data-driven method and the moving window data-driven method is described here to conduct the prognostics of the natural aging system.

Figure 6:
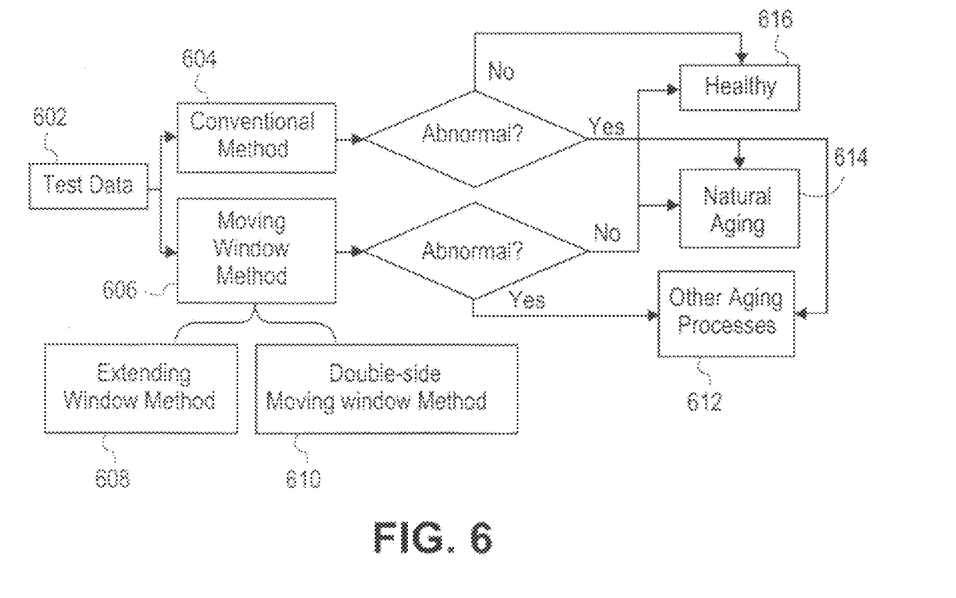
FIG. 6 presents a flowchart illustrating the process of the PHM method for natural aging systems based on a combination of the conventional data-driven methods and the moving window data-driven methods.

FIG. 6 is a flow chart illustrative of this new method, usable with any one of a number of conventional data driven methods. Test Data 602 from a test window is subject to processing according to conventional data-driven method 604, used to detect anomalies of a system, including natural aging. The conventional data-driven method 604, however cannot distinguish natural aging from other aging processes. The moving window data-driven method 606 (including the extending window method 608 and the double-side moving window method 610) applied to the same test data 602, is used to remove the natural aging effect on the test data transferred from the previous training data. The results of the moving window detection method 606 will only show the anomalies that are not associated with the natural aging that occurred in the training data.

The combination of the conventional data-driven method 604 and the moving window data-driven method 606 can determine whether the detected anomalies are due to natural aging or other processes. As shown in FIG. 6, if both methods do not detect any anomalies, the system is healthy 616. If the conventional data-driven method 604 detects anomalies, but the corresponding moving window data-driven method 606 does not, then the anomalies are due to natural aging 614. If both methods detect anomalies, it means that the anomalies are caused by aging processes or failure mechanisms 612 other than natural aging. If moving window method 606 detects anomalies but the conventional method 604 does not, this means the training data of the conventional method, or moving window method is not appropriate.

The next section describes the implementation of prognostics for natural aging systems based on the prior MSET technique.

Multivariate State Estimation Technique (MSET)

MSET was developed by the Argonne National Laboratory, initially for the surveillance of sensors and components in nuclear power plant applications. In this technique, MSET learns the correlation between the parameters of the monitored system from a set of training data. Then it calculates the estimation of the new test data and the residual between the estimation and the test data. Then determined is whether there is an anomaly shown in the residual.

Figure 7:
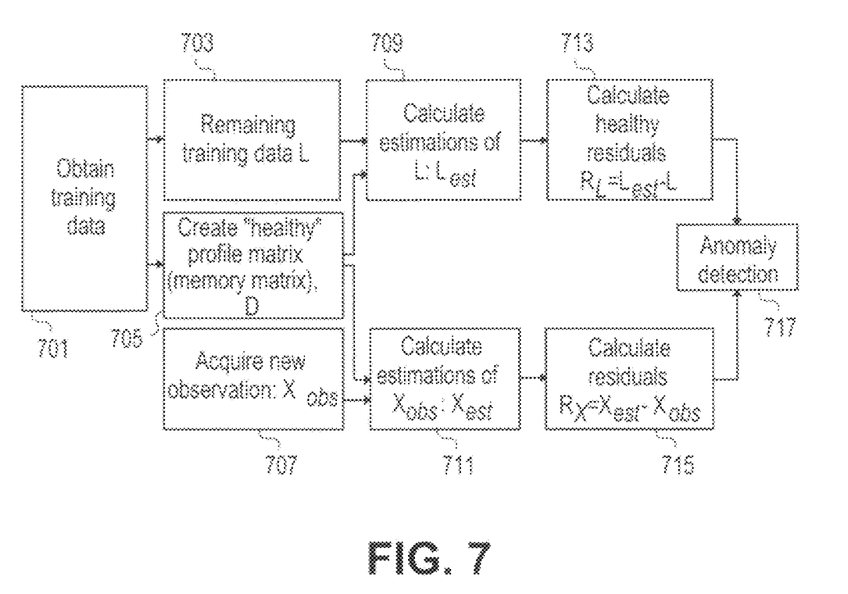
FIG. 7 presents a flowchart illustrating the procedure of MSET.

FIG. 7 is a logic flow chart which illustrates the MSET process, the same process logic applicable to determining whether an anomaly is detected or not for both the conventional MSET method and the moving window MSET method. Notably, when applied to the conventional MSET method, the training data remains fixed. When applied to moving window method, the training data set keeps changing. With parameters for monitoring the system selected, new observations $(X_{obs})$ 707 are acquired. Healthy data from historical healthy data or currently acquired data are chosen as training data 701. Special data from the training data 701 are picked to create memory matrix D (705). In one such approach, by way of example only, both the extreme data, that is the maximum and minimum values recorded within a data interval are selected, and combined with the recorded values at given occurrences, such as at every $5^{th}$ position, where the values are arranged in ascending or descending order. The remaining training data L, that is the data not entered in memory matrix 705, is designated by box 703. When memory matrix D (705) is created, MSET goes through two processes. One, with reference to boxes 703 and 709, is to calculate estimates $(L_{est})$ 709 of all of the remaining training data L 703 that were not chosen by the memory matrix 705 even though they are training data. MSET then calculates the residuals 713 between the estimates 709 and the remaining training data L (703). Because all of these remaining training data 701 are healthy, the residuals 713 represent the features of healthy states of the system and are called healthy residuals. MSET, employing memory matrix D, also calculates the estimates ($X_{est}$) 711 of the new observation ($X_{obs}$) 707, and the residuals 715 between the estimates 711, and the corresponding observations 707. These residuals 715 show the actual states of the system and are called actual residuals. The following anomaly detection 717 process (as later more fully described) compares actual residuals 715 with healthy residuals 713 in order to decide whether the current system is healthy or not. A further discussion of the MSET approach can be found in U.S. Pat. No. 6,119,111, which patent is incorporated herein by reference.

A PHM Method for Natural Aging Systems Based on MSET

Recently, the application of MSET has been extended to the monitoring and detection of the electronics of individual electrical components or complex computer servers. The prognostics for natural aging systems requires the combination of the conventional MSET and the MW-MSET.

Combination of Conventional MSET and MW-MSET

Figure 8:
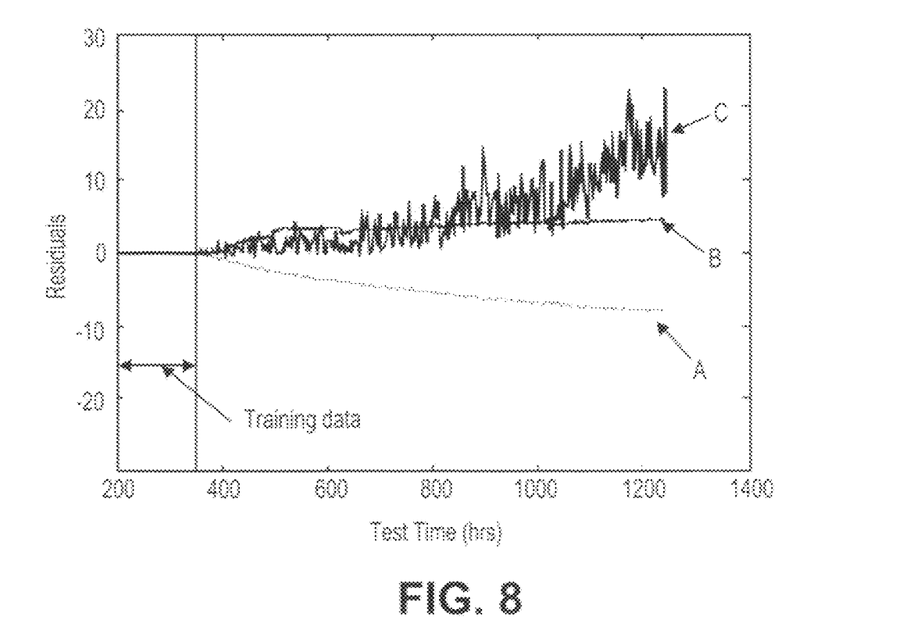
FIG. 8 illustrates the residuals of the parameters of component #1 calculated by the conventional MSET.

MSET requires that the training data should contain the entire range of the healthy system and should not contain any degradation. In fact, these two requirements are difficult to meet. For conventional MSET the training data is selected from the initially monitored natural aging system itself if sufficient historical data is not available, and once obtained, the training data is not updated. Using component #1 shown in FIG. 1 as an example, the data in box 202 of FIG. 2 is designated as the training data. This training data 202 does not, however, contain the entire range of the healthy aging system. The corresponding residuals calculated by MSET are shown in FIG. 8. MSET detected the natural aging as an anomaly and gave an alarm at 521 hours (shown in the Table 2, below, for component #1). In fact, this alarm as detected by MSET was a false alarm triggered by natural aging, this being so because at that time all of the parameters satisfied the healthy criteria and no failures had occurred.

Figure 9:
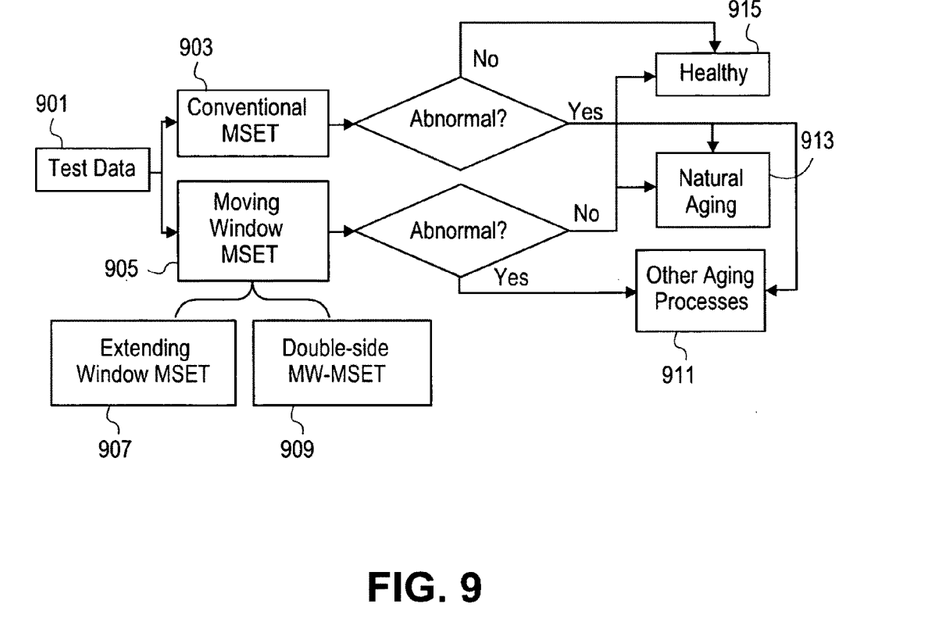
FIG. 9 presents a flowchart illustrating the process of the PHM method for natural aging systems based on a combination of the conventional MSET and the MW-MSET.

Application of the moving window method overcomes the above limitations. As described in the previous section, both the extending window method 608 and the double-side moving window method 610 can be used (See FIG. 6). The processes of the extending window MSET 907 and the double-side MW-MSET 909 of FIG. 9 are explained for component #1 as shown in FIG. 3, FIG. 4, and FIG. 5.

The estimation 711 of the corresponding observation 707 generated by MSET is based on the training data 701 and observation 707, so that the estimation 711 contains the features of both of them. If the training data 701 includes natural aging, the natural aging features will be transferred to the estimation 711. Because the residual 715 is the difference between the estimation 711 and the corresponding observation 707, the transferred natural aging effect will be removed in the residuals 715. For the extending window MSET and double-side MW-MSET, the residuals 715 only show the degradations that have nothing to do with natural aging.

Detection Methods

Many methods, such as the simple threshold detection and the sequential probability ratio test (SPRT), can be used to analyze the calculated residuals (box 717) in order to detect anomalies. For the threshold detection method, the key is to define the detection threshold. In the SPRT method, several parameters are specified by the user: for example, the system disturbance magnitude (M and V) and the false alarm and missed alarm probabilities. Both M and V are considered to be the boundaries used to trigger the alarm. Additional description of the SPRT method can be found in U.S. Pat. No. 5,459,675, which patent is incorporated herein by reference. Herein, the threshold detection method was used to detect anomalies from the residuals calculated by the MW-MSET. The method to define the threshold introduced in this section can be transferred to SPRT to define the system disturbance magnitude.

The anomaly detection threshold for the MW-MSET can be created from the historical healthy natural aging information. The historical data includes two parts. The first is the historical data of other similar systems (the same manufacturer, the same model, etc.) in the same or a similar environmental and operational environment. This data can help to understand the general operational information of the system. The second part is the historical data of the detected system itself. This data can help to understand the historical behavior and create a specific criterion for the particular system.

The combination of the conventional MSET 903 and the moving window MSET 905, (including the extending window MSET 907 and the double-side moving window 909) as illustrated in FIG. 9 can be used to conduct prognostics for natural aging systems. This method can identify whether the anomalies are caused by natural aging 913. If both methods do not detect any anomalies, the system is healthy 915. If the conventional MSET 903 detects the anomalies but the MW-MSET 905 does not, then the anomalies are due to natural aging 913. If both methods detect anomalies, it means that the anomalies are caused by some other aging processes or failure mechanisms 911 other than natural aging. If MW-MSET 905 detects anomalies but the conventional MSET 903 does not detect, that means the training data of conventional MSET, or MW-MSET is not appropriate.

EXAMPLE

The data of two individual aging components, capacitors #1 and #2, are used as examples to demonstrate the performance of the prognostic method. Capacitor #1 exhibited natural aging but was still healthy at the conclusion of the experiment. Capacitor #2 aging indicated other aging processes and failed during the experiment. Three parameters, A, B, and C, were monitored and analyzed by the conventional MSET 903, the extending window MSET 907, and the double-sided MW-MSET 909. Only the fixed-size window is demonstrated here.

Figure 10:
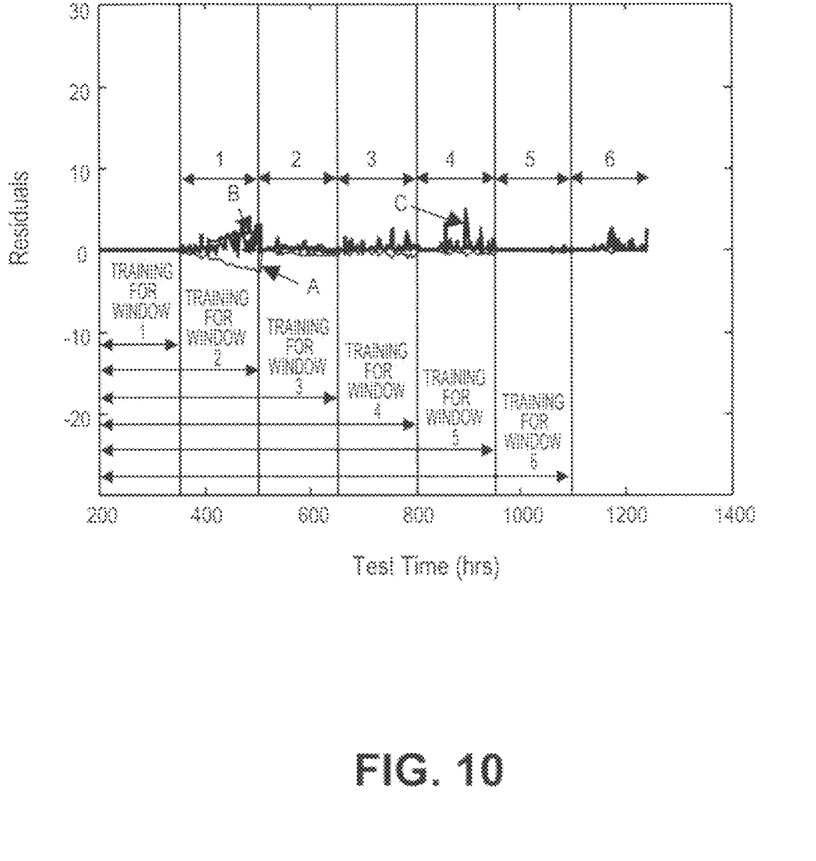
FIG. 10 illustrates the residuals of the parameters of component #1 calculated by the single-side MW-MSET or extending window MSET.
Figure 11:
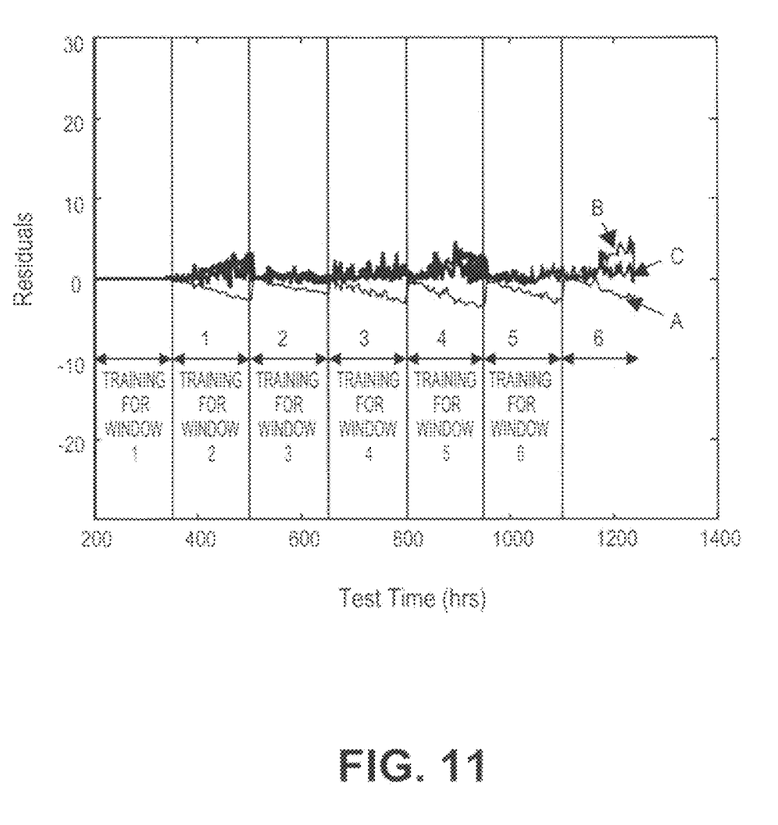
FIG. 11 illustrates the residuals of the parameters of component #1 calculated by the double-side MW-MSET.
Figure 12:
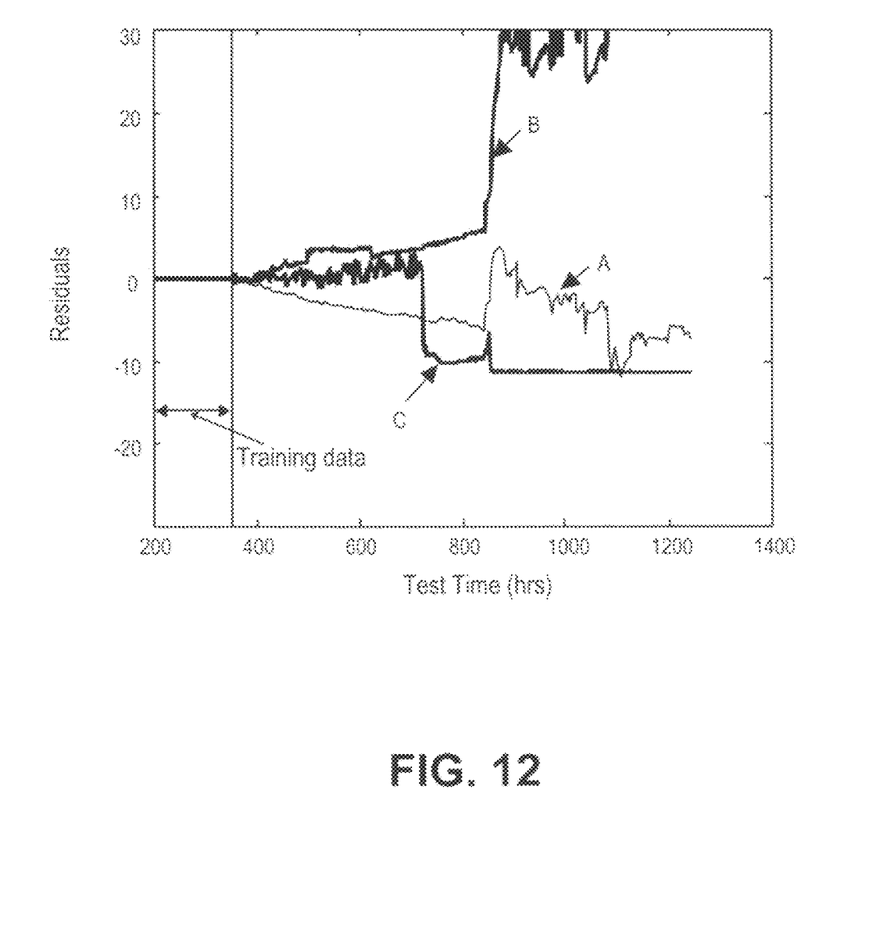
FIG. 12 illustrates the residuals of the parameters of component #2 calculated by the conventional MSET.
Figure 13:
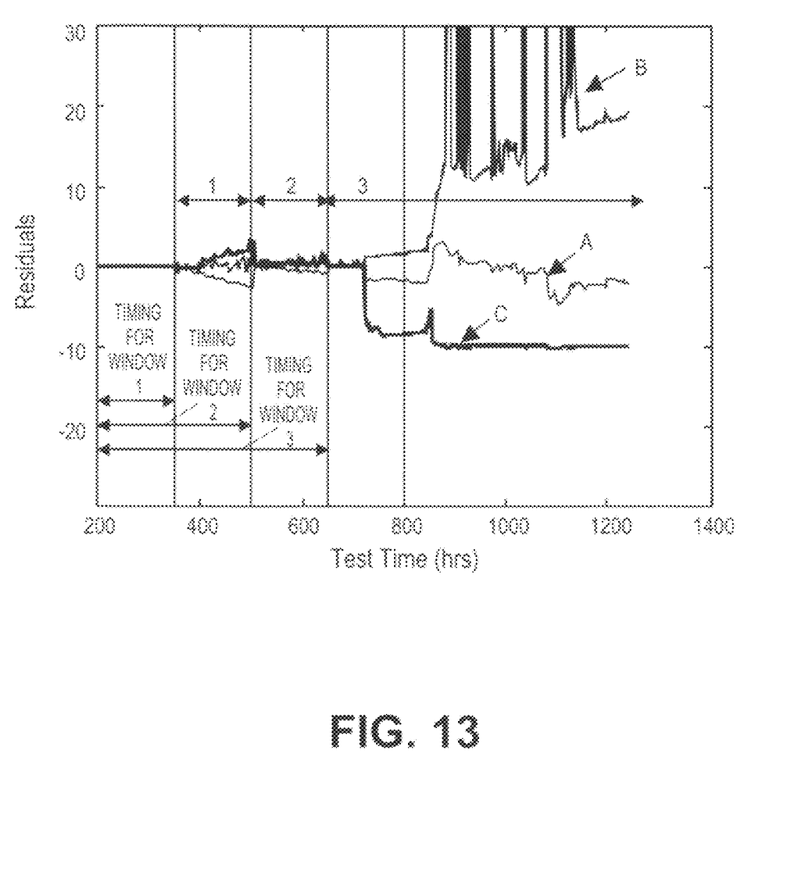
FIG. 13 illustrates the residuals of the parameters of component #2 calculated by the single-side MW-MSET or extending window MSET.
Figure 14:
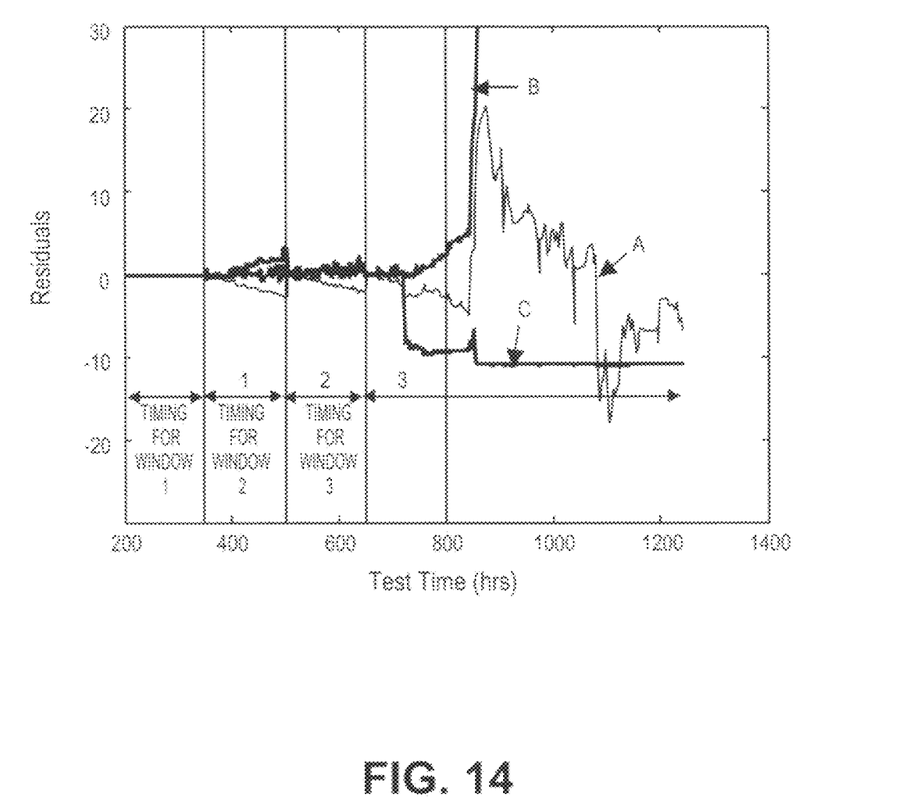
FIG. 14 illustrates the residuals of the parameters of component #2 calculated by the double-side MW-MSET.

FIG. 8, FIG. 10, and FIG. 11 show the residuals of the parameters of capacitor component #1. FIG. 12 through FIG. 14 show the residuals of the parameters of capacitor component #2. FIG. 8 and FIG. 12 are plots of the residuals over time calculated by the conventional MSET 903. FIG. 10 and FIG. 13 are plots of the residuals over time calculated by the extending window MSET 907, and FIG. 11 and FIG. 14 show the residuals over time calculated by the double-side MW-MSET 909. The data of both capacitors were divided into seven windows, each with a size of approximately 150 hours. Because the early period of the experiment was not stable, the data analysis was conducted from the 200th hour instead of from the beginning. Data was collected every 3 hours and stored in a data logger. The MSET processing was performed by a computer.

For the conventional MSET 903, the data from 200-350 hours (the first window) was selected as the training data. The conventional MSET 903 used this training data to analyze all of the test data. Data in the range of 200-350 hours was also the first training window for the extending window MSET 907 and the double-side MW-MSET 909. While the first training data windows were the same, the extending window MSET 907 and the double-side MW-MSET 909 had different training data after determining the health of the data in the first test windows. If the data was healthy, the extending window MSET 907 extended the training data while the double-side MW-MSET 909 moved the training data. For example, when the data from 350-500 hours were detected to be healthy, the extending window MSET 907 extended the training data from 200 to 500 hours for the analysis of next test window (test window 2 [500-650 hours]). But the double-side MW-MSET 909 moved the training data from data in 200-350 hours to the data from 350-500 hours. This meant that data from 200 to 350 hours were no longer included in the new training data. If any anomalies were detected in the test window, both the extending window MSET 907 and the double-side MW-MSET 909 stopped the updating of the training data and used the current training data to analyze the data in the next test window. This case is shown in FIG. 13 and FIG. 14.

The detection criteria for each parameter are listed in Table 1. These criteria are created based on the combined information of the other healthy capacitors in the same experiment (mean±3 sigma range) and the tested capacitors #1 and #2. The detection results are shown in Table 2.

TABLE 1

Detection Threshold

| Capacitor | Parameter | Detection threshold |
|---|---|---|
| #1 | A | [−2.94, 0.47] |
|  | B | [−1.55, 3.46] |
|  | C | [−1.12, 5] |
| #2 | A | [−2.94, 0.47] |
|  | B | [−1.55, 3.46] |
|  | C | [−1.12, 5] |

TABLE 2

Detection Results

| Capacitor (left column) and Parameter (right column) | | First anomaly (hrs) (conventional MSET) | First anomaly (hrs) (Extending window MSET) | First anomaly (hrs) (Double-side MW-MSET) | Actual failure time in the experiment (hrs) |
|---|---|---|---|---|---|
| #1 | A | 521 | No | No | Did not fail |
|  | B | 534 | No | No |  |
|  | C | 663 | No | No |  |
| #2 | A | 514 | 809 | 856 | 856 |
|  | B | 720 | 813 | 849 |  |
|  | C | 730 | 730 | 730 |  |

FIG. 8 shows that the residuals generated by the conventional MSET 903 for capacitor #1 have been affected by natural aging. Based on the detection threshold, the conventional MSET 903 gave alarms for each parameter, but neither the single-side nor the double-side MW-MSET detected any anomalies (see Table 2). This means that the anomalies detected by the conventional MSET 903 were false alarms due to the natural aging effect. These detection results agreed with the actual experimental results.

For capacitor #2, the conventional MSET 903 detected anomalies from the 514th hour, but two MW-MSETs 905 did not detect anomalies until the 730th hour. So the alarms before the 730th hour were all due to natural aging. But at the 730th hour, all three methods detected the same anomalies, which were not caused by natural aging. When the original data was checked, the parameter C of capacitor #2 was found to have suddenly decreased and never recovered. After another 126 hours, this component failed because the parameter C reached the failure criteria.

These two cases show that the combination of the conventional MSET 903 and the MW-MSET 905 generates a novel prognostic method that identifies whether the detected anomalies are due to natural aging or other aging processes. Another important advantage of this detection method shown in the examples is that the detection and identification are finished before the actual failures occur. This valuable prognostics information allows the operator to have enough time to take actions such as maintenance or replacement of the abnormal components or systems.

When comparing the residuals calculated by the extending window MSET and double-side MW-MSET, it can be seen that the extending window MSET has better performance than the double-side MW-MSET in these examples. The selection of the MW-MSET methods depends on the tested data.

Although the moving window method has been used in Principle Component Analysis (PCA) for chemical process control, it is novel in the data-driven prognostic method for monitoring the reliability of a component or system. Furthermore, without the combination with the conventional data-driven method, the moving window method alone cannot distinguish natural aging from other aging processes. In the present invention, the moving window method is used to overcome the shortcomings of the conventional data-driven prognostic method, and the combination with the conventional data-driven method can detect the anomalies and determine whether the detected anomalies are due to natural aging or other aging processes.

In the application of the method of this invention, sensors can be provided with electronic components, and sensor data can be recorded at preset intervals. The length of the intervals can be determined by the user in the set up of the monitoring system, taking into account such things as the nature of the component, the environment in which it will be monitored, and its intended use. The collected data, once it is stored, may be processed by an onboard controller/computer or transmitted to a remote receiving station for processing. The algorithms used to process the collected data based on the method of this invention may be provided in software. Similarly, the capability to determine what constitutes an anomaly, and whether that anomaly is due to aging or other causes, can likewise be incorporated into supporting software. The calculations themselves are performed by computer.

While the foregoing is directed to embodiments of the present invention, other and further embodiments of the invention may be devised without departing from the basic scope thereof, and the scope thereof is determined by the claims that follow.

The invention claimed is:

1. A prognostic and health management method for monitoring an aging system, including a component of said system, said method useful for determining whether or not detected anomalies are due to natural aging or other aging processes, said method based on a combination of a conventional data-driven method and a moving window data-driven method, including the steps of:
   detecting anomalies of said system, or component of said system based on monitored parameters of the system using both the conventional data-driven method and the moving window data-driven method; and
   identifying whether said detected anomalies are due to natural aging or other aging processes or causes wherein;
      if both methods do not detect any anomalies, the system or component is healthy;
      if the conventional data-driven method detects anomalies but the moving window method does not, the detected anomalies are due to natural aging;
      if both methods detect anomalies, the detected anomalies are caused by other aging processes besides natural aging;
   wherein said detecting and identifying steps are performed with the aid of a computer.

2. The prognostic and health management method of claim 1, wherein both the conventional and moving window data-driven method can be any data-driven method in which training data is used to train algorithms or to create a detection baseline or criteria, including the multivariate state estimation technique (MSET), neural network (NN), and Mahalanohis distance (MD) method.

3. The prognostic and health management method of claim 2 wherein the training data used in the training process is progressively updated by a moving window, and wherein a first training window is defined by a first data set collected over a first interval of time, the first data set representative of a healthy condition, a second, test window then defined by a test data set collected over a second interval of time, and the training data of the first window compared to the test data set of the second window to detect anomalies.

4. The prognostic and health management method of claim 3 wherein the moving window method employs either a single-sided moving window data-driven method, or a double-sided moving window data-driven method, size of the window or interval of time being fixed or flexible based on a particular application.

5. The prognostic and health management method of claim 4 employing a single-sided moving window wherein a first window is defined by a first data set collected over a first interval of time, the first data set representative of a healthy condition and used as training data, a second window then defined by a second data set collected over a second interval of time, the data set of the first window compared to the data set of the second window, whereby, if the data set of the second window is determined to be healthy, the second data set is added into the first window to expand the first data set, and the expanded data set used as new training data which is then compared with a test data set collected during a next interval of time to detect anomalies.

6. The prognostic and health management method of claim 4, employing a double-side moving window wherein, a first training window is defined by a first data set collected over a first interval of time, the first data set representative of a healthy condition and used as training data, a second window then defined by a second data set collected over a second interval of time, the window of the first data set compared to the window of the second data set, whereby, if the data set of the second window is determined to be healthy, the data set of the second window is used as new training data for the next comparison, and the data set of the first window discarded, the new training data compared with a data set of a next interval of time to detect anomalies.

7. The prognostic and health management method of claim 3, further including a simple threshold detection method to define anomalies, which method creates the criteria of a healthy system in terms of features of the training data and compares the features of the test data with the criteria.

8. The prognostic and health management method of claim 3, further including a sequential probability ratio test or another decision-making method such as that can detect the anomalies based on features of collected data.

9. The prognostic and health management method of claim 3 wherein an anomaly is defined as at least five continuous test data readings that are outside of a defined healthy boundary.

10. The prognostic and health management method of claim 3, further including a conventional multivariate state estimation technique (MSET) and a moving window-multivariate state estimation technique (MW-MSET) such that:
    if both methods do not detect anomalies, the system is deemed healthy;
    if the conventional MSET detects anomalies but the MW-MSET does not, then the detected anomalies are deemed to be due to natural aging;
    if both methods detect anomalies, the detected anomaly is anomalies are deemed to be caused by other aging processes besides natural aging.

11. The prognostic and health management method of claim 10, wherein the performance of the conventional MSET for aging systems is improved by incorporating a moving window method in which training data is updated by an extending window, or a double-side moving window, for both of which size of the moving window or the amount of data used to update the training data is fixed or flexible.

12. The prognostic and health management method of claim 10 wherein either a simple threshold detection method, which creates the criteria of a healthy system in terms of calculated residuals from the training process and compares the calculated residuals of the test data with the criteria, or other decision-making method, such as a sequential probability ratio test method, is used to detect anomalies based on the calculated residuals.

* * * * *